(12) United States Patent
Stein (10) Patent No.: US 8,316,364 B2
(45) Date of Patent: Nov. 20, 2012

(54) PEER-TO-PEER SOFTWARE UPDATE DISTRIBUTION NETWORK

(75) Inventor: Brian T. Stein, Cambridge, MA (US)

(73) Assignee: Red Hat, Inc., Raleigh, NC (US)

( * ) Notice: Subject to any disclaimer, the term of this patent is extended or adjusted under 35 U.S.C. 154(b) by 1220 days.

(21) Appl. No.: 11/712,803

(22) Filed: Feb. 28, 2007

(65) Prior Publication Data

US 2008/0209414 A1 Aug. 28, 2008

(51) Int. Cl.
*G06F 9/44* (2006.01)
(52) U.S. Cl. ......... 717/173; 717/172; 717/177; 717/178
(58) Field of Classification Search .................. 717/177, 717/172, 173, 178
See application file for complete search history.

(56) References Cited

U.S. PATENT DOCUMENTS

| | | | |
|---|---|---|---|
| 6,694,482 B1 * | 2/2004 | Arellano et al. ............. 715/251 |
| 7,127,613 B2 * | 10/2006 | Pabla et al. .................. 713/171 |
| 7,178,144 B2 * | 2/2007 | Melchione et al. ........... 717/172 |
| 7,284,156 B2 * | 10/2007 | Creamer et al. ................ 714/38 |
| 7,515,718 B2 * | 4/2009 | Nguyen et al. ................ 380/278 |
| 7,558,797 B2 * | 7/2009 | Li ........................................ 1/1 |
| 7,577,722 B1 * | 8/2009 | Khandekar et al. ........... 709/220 |
| 7,613,770 B2 * | 11/2009 | Li .................................. 709/203 |
| 7,716,660 B2 * | 5/2010 | Mackay ......................... 717/173 |
| 7,721,110 B2 * | 5/2010 | Kouznetsov et al. ......... 713/187 |
| 7,734,717 B2 * | 6/2010 | Saarimaki et al. ............ 709/217 |
| 2003/0144958 A1 * | 7/2003 | Liang et al. ...................... 705/51 |
| 2003/0163702 A1 * | 8/2003 | Vigue et al. ................... 713/176 |
| 2004/0015995 A1 * | 1/2004 | Shao et al. ....................... 725/87 |
| 2004/0019889 A1 * | 1/2004 | Melchione et al. ........... 717/177 |
| 2004/0261071 A1 * | 12/2004 | Chuang et al. ................ 717/170 |
| 2006/0130037 A1 * | 6/2006 | Mackay ......................... 717/168 |
| 2006/0155674 A1 * | 7/2006 | Traut et al. ........................ 707/2 |
| 2006/0277092 A1 * | 12/2006 | Williams ......................... 705/10 |
| 2007/0050761 A1 * | 3/2007 | Hester et al. .................. 717/168 |
| 2008/0189697 A1 * | 8/2008 | Kachroo et al. .............. 717/171 |

OTHER PUBLICATIONS

Frenot et al., "Component Deployment using a peer-to-peer overlay", 2005.*
Tamimi, "Automated Peer-to-Peer Security-Update Propagation Network", 2007.*
Sung et al., "Neighbour selection strategies for P2P systems using tit-for-tat exchange algorithm", 2005.*

* cited by examiner

*Primary Examiner* — Phillip H Nguyen
(74) *Attorney, Agent, or Firm* — Lowenstein Sandler PC (57) ABSTRACT

A software package of interest is identified, and information about a latest version of the package is retrieved. Then, data corresponding to the latest version are downloaded from a peer-to-peer network, and the downloaded package is installed. Alternative methods and systems for use in particular environments are also described.

19 Claims, 7 Drawing Sheets

PEER-TO-PEER SOFTWARE UPDATE DISTRIBUTION NETWORK

FIELD

The invention relates to peer-to-peer data distribution networks. Specifically, the invention relates to methods for distributing software updates via a peer-to-peer data distribution network.

BACKGROUND

The widespread availability of Internet Protocol ("IP") network connectivity has made it possible to create large-scale distributed networks of computing systems to perform many tasks. For example, the Great Internet Mersenne Prime Search ("GIMPS") project provides software that can be executed on various types of computers to participate in a distributed search for large prime numbers. With appropriately-designed software, individual computers in a distributed network can come and go at will, and the project being performed by the network will simply proceed faster or slower according to the resources available.

One project that has proven amenable to a distributed approach is the dissemination of large volumes of data. When many people wish to obtain a copy of a data object (and particularly a large—multi-megabyte—data object) at nearly the same time, the provider of the data object may have inadequate network bandwidth to timely supply the requested data to all corners. In addition, other network nodes may restrict the smooth and rapid dissemination of data when many clients all attempt to retrieve data from a single source.

A distributed data dissemination network uses computers that have received a portion of a data object as additional sources of the object. For example, if the origin server provides a block of data to a first client, then a second client can obtain the block of data from either the origin server or the first client. A third client has an even wider range of possible places from which to receive the data. Distributed data dissemination networks are often called "peer-to-peer" networks because participants in the network ("peers") exchange data among themselves to reduce the load on an original server and to take advantage of peers' upstream data communication capacity. (This upstream capacity would be unused in a traditional distribution scenario where each receiving computer obtained all the data directly from the origin server.)

Peer-to-peer software often includes functionality to thwart data tampering, where a malicious client distributes a portion of a data object, modified to be unuseable or to cause undesirable operation at a recipient's computer. Data protection is usually built on one-way cryptographically secure hash functions and digital signatures. "Fairness" functionality is also sometimes provided, so that participants in the peer-to-peer network must help to distribute the data to others if they wish to receive portions of data objects they do not yet have. BitTorrent™ is one popular peer-to-peer data distribution software application.

BRIEF DESCRIPTION OF DRAWINGS

Embodiments of the invention are illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

DETAILED DESCRIPTION

Embodiments of the invention coordinate the construction and distribution of software package updates through a peer-to-peer data distribution network. This exploits a resource that has recently become more commonly available (widespread Internet Protocol ("IP") connectivity) to address the older problem of delivering software updates to machines that need them.

Figure 1:
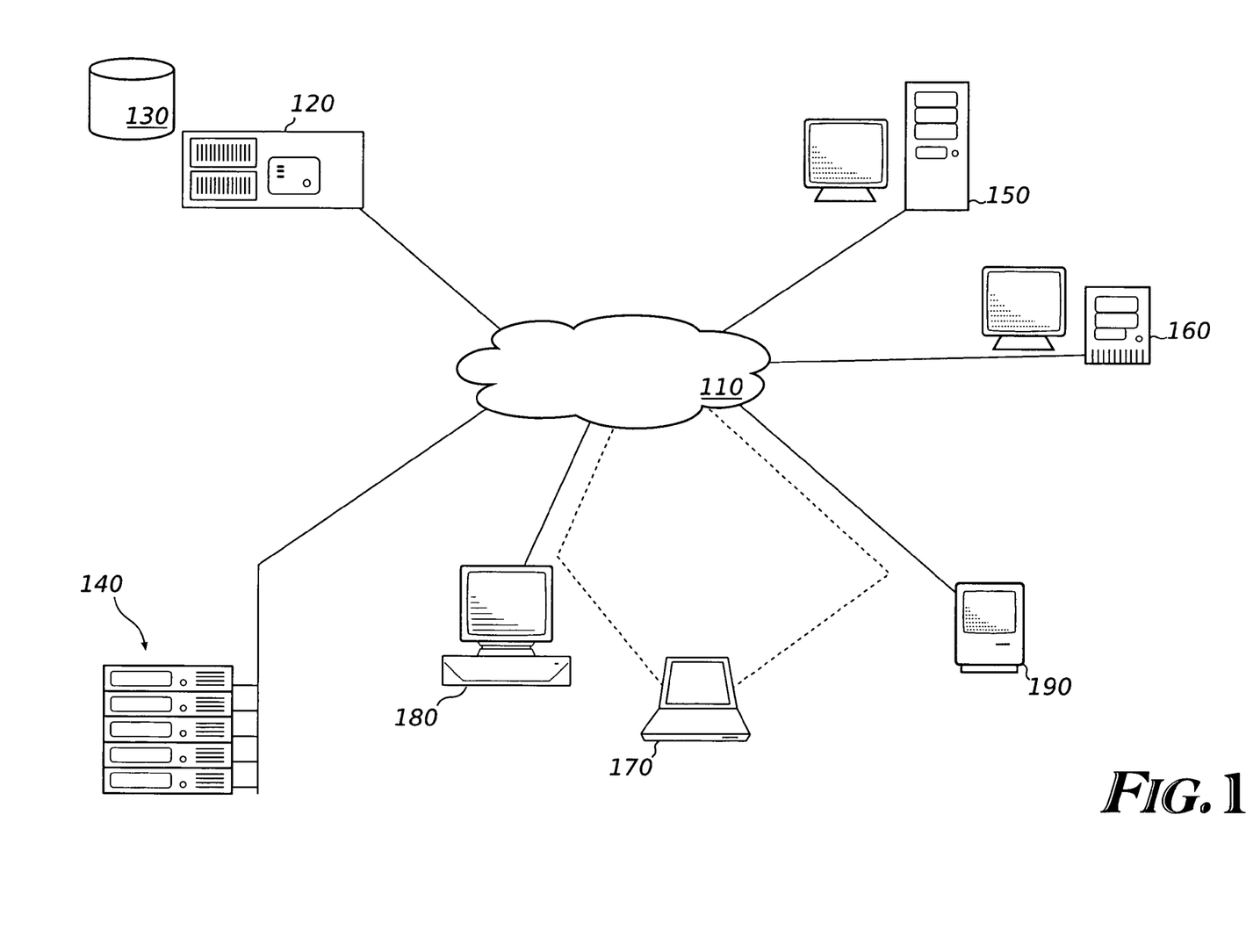
FIG. 1 shows an environment where an embodiment of the invention can be used.

FIG. 1 shows an overview of an environment where an embodiment of the invention can operate. Centrally-located "cloud" 110 represents a distributed data communication network such as the Internet, that permits communication between any devices connected thereto. A system 120 connected to network 110 is considered the "origin" server for purposes of embodiments of the invention: data at system 120 (perhaps stored on mass storage device 130) is to be distributed efficiently to other systems and devices that can communicate over network 110.

Systems that are to receive data from origin server 120 may be thought of as "destination" or "target" systems. Although destination systems are similar in the sense that any of them can communicate over network 110, it is appreciated that there are several different physical arrangements that can affect the speed of data transfer between systems. For example, many computer systems 140 may be operated within a data center environment, and may have greater communication bandwidth available for transferring data among themselves than is available to communicate with other systems outside the data center. Other systems (e.g. 150, 160) may be located alone at homes or offices, and may not experience much variability in communication bandwidth to other systems (i.e. the limiting factor may be the system's connection to the distributed network, and not some other computer's connection). Some systems, such as laptop 170, may experience significant variability in communication bandwidth: when laptop 170 is operated at its owner's workplace, it may have good connectivity to another computer 180 at the workplace and poor connectivity to the owner's home machine 190. If the owner takes laptop 170 home, then its connectivity to home machine 190 may be vastly improved, while its connectivity to office computer 180 is correspondingly reduced.

The existence of these and other similar sub-environments, with varying inter- and intraconnection communication characteristics, can affect the operation of embodiments of the invention as discussed below.

As a preliminary matter, it is important to recognize that computer systems and similar devices that interact according to an embodiment of the invention are related as members of a group that could be described as a "community of interest." Although a distributed data communication network may permit communication between any arbitrary pair of devices (or even among any arbitrary group of devices, when multicast service is provided), embodiments of the invention relate to communications between systems that share an interest in obtaining a particular data object. For many types of data, a community of interest cannot automatically be determined. For example, when a peer-to-peer data distribution network is used to distribute audio data (e.g. music), users of the various participating systems are unlikely to want any random song that happens to be available. Instead, they may want a particular song by a particular artist, and not a different song, even by the same artist (or another artist's rendition of the same song).

However, for the types of data distributed according to embodiments of the invention, communities of interest can be automatically determined in many cases. Embodiments operate to distribute software and software updates efficiently. Since software can often be automatically associated with a particular computer system, an embodiment may be able to determine that a first software update is useful for the system, while a second software update is not useful. Thus, the system might be considered part of the community of interest for the first software update, but not for the second software update.

Figure 2:
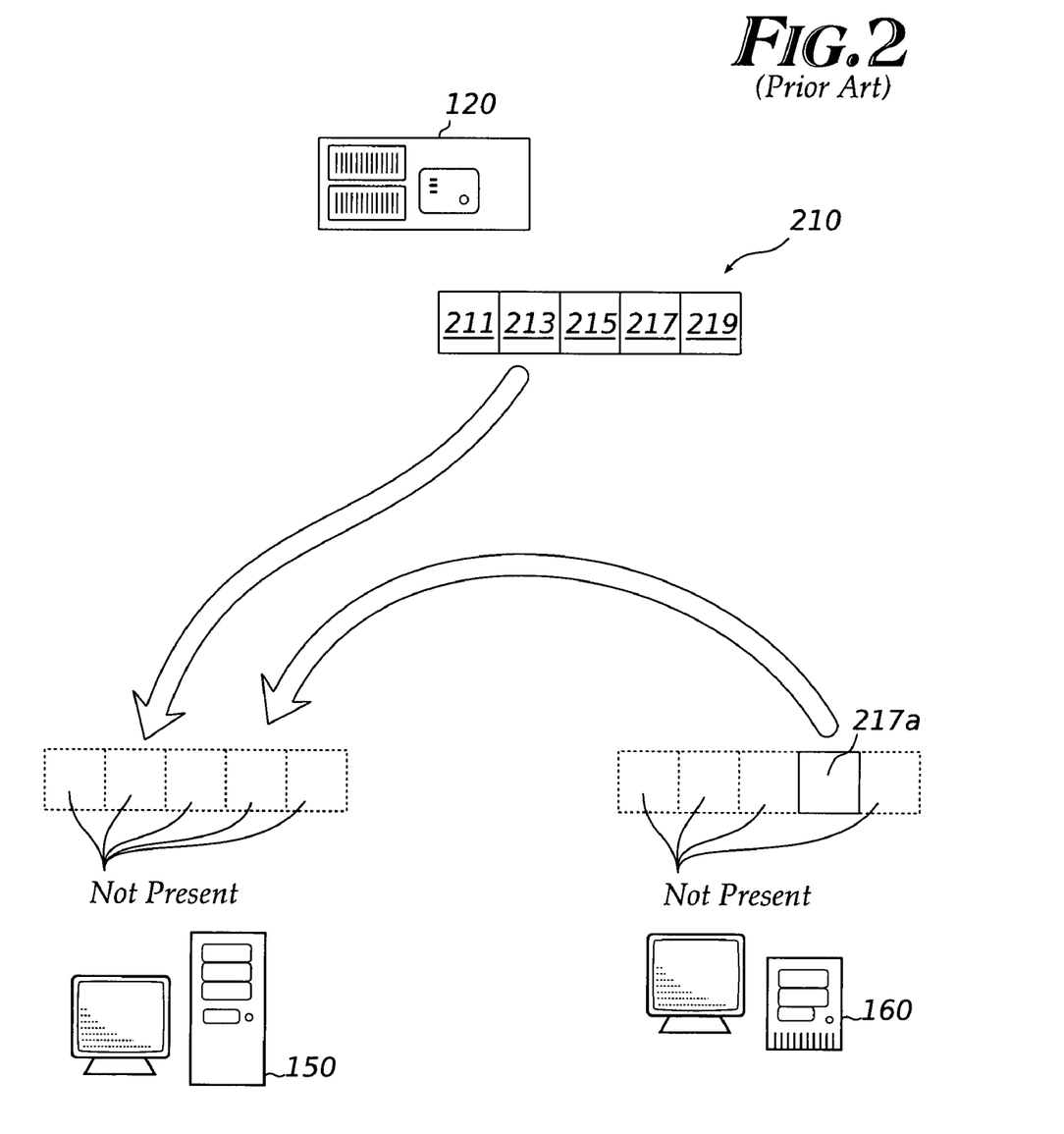
FIG. 2 shows how data is distributed in some peer-to-peer networks.

FIG. 2 provides a high-level overview of data distribution through a peer-to-peer network. An origin system 120 has a data object 210, and other participants in the network 150, 160 wish to obtain copies. The data object is split (logically or actually) into a number of segments 211, 213, 215, 217, 219 and each client operates to collect all of the segments. If a segment (such as 213) is only stored at the origin server, a client (e.g. system 150) must obtain the segment from the origin. However, for segments that have already been sent to another client (e.g. segment 217, a copy 217a of which is present at system 160), a client can obtain the segment from either the origin 120 or the client 160 that has a copy. When a client obtains a segment from a peer other than the origin server 120, the transaction offloads some of the origin server's work to the peer. This frees additional bandwidth for the origin server to send not-yet-distributed segments to clients that request them, and takes advantage of the copy-supplying client's upstream bandwidth. This upstream communication capability goes largely unused in traditional server-to-client data distribution schemes.

A number of parameters and operational details can be adjusted to obtain desired characteristics from a peer-to-peer data distribution network. For example, clients can be configured to attempt to obtain data segments in random order. This may increase the chances that any particular segment is available from a peer, so that a system seeking the segment need not contact the origin server. Peers may also implement "tit-for-tat" data exchange, where one peer will only send a segment to another peer if the other peer also sends a segment to the first peer. In some peer-to-peer systems, clients that have collected all of the segments of the data object may continue to distribute segments to other clients, even though they do not need any additional data themselves. Currently-available peer-to-peer software packages such as BitTorrent™ contain logic to implement these and other operational details.

Figure 3:
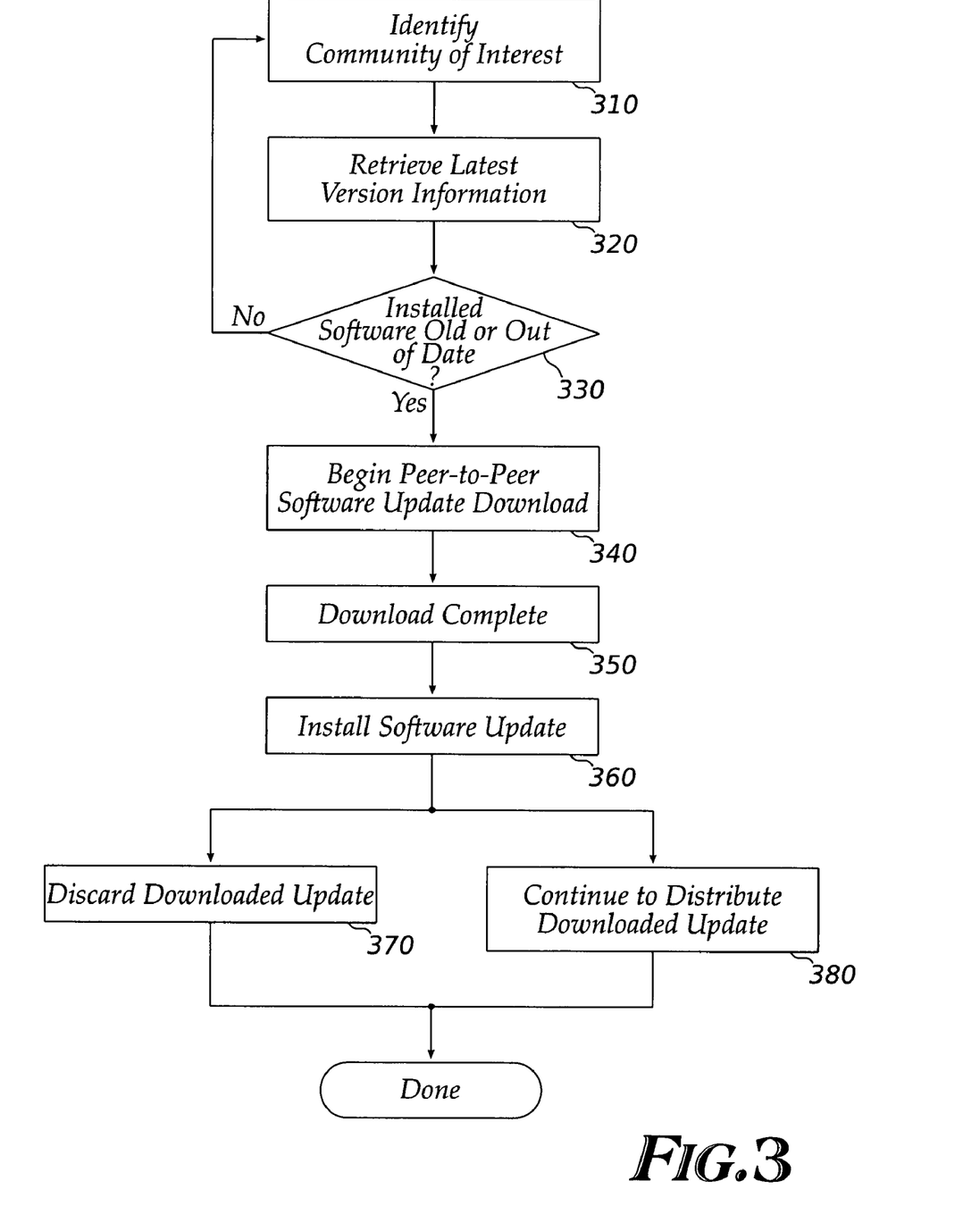
FIG. 3 outlines a method according to an embodiment of the invention.

FIG. 3 is a flow chart that outlines operations of an embodiment of the invention, from the perspective of a client system (rather than the origin server). The client automatically identifies one or more communities in which it is interested (310). These communities may correspond approximately to software packages installed at the client, but some embodiments may aggregate several software packages into larger interest groups for improved data distribution efficiency and/or reduced administrative overhead.

For each of the communities of interest, the client retrieves up-to-date version information (320). This information may be distributed through traditional means (e.g. as a list of software package identifiers and version numbers retrieved from a web server or file server), or it may be seeded into and distributed through a peer-to-peer network.

If any software package installed at the client is old or out-of-date (according to the version information just retrieved) (330), the client begins downloading a data object containing information necessary to update the software package (340). This download process proceeds according to the logic and protocols used by a peer-to-peer network. For example, the client may initiate a BitTorrent™ download. Some embodiments may use a specialized peer-to-peer protocol (instead of BitTorrent or a similar, standard protocol) so that the operation of the peer-to-peer network can be tuned for improved performance in the specific application of distributing software updates.

The client participates in the peer-to-peer network for at least as long as necessary to collect all the segments of the software update data package (350). When the complete package has been downloaded, a software updater installs it (360). Software update installation may involve overwriting old versions of executable files and libraries, updating configuration files to preserve site-specific settings while providing any new configuration parameters required by the new version of software, and recording software version information in a database so that a subsequent update cycle can also proceed correctly.

In some embodiments, the client may discard the software update data package (370), while in other embodiments, the client may retain (and even continue distributing) the software update (380).

Although the procedure outlined above is stated in reference to "updating" a software package (i.e. replacing a currently-installed version of the package with a newer version of similar functionality), it can equally well be applied to installing a new software package, where "updating" can be seen as transitioning from a state where a "null" package is installed, to a state where the "null" package has been replaced with an updated package that provides new functionality. This is important because some software updates may introduce new dependencies between packages. For example, a first version of package "A" may not require any functionality provided by any other software package. However, a new version of package "A" may require another package, "B," to operate correctly. Thus, "A" cannot be updated unless "B" is also installed. If "B" is missing from the client system, the update procedure must download it (possibly from the same peer-to-peer network) and install it before the update to package "A" can be completed.

Figure 4:
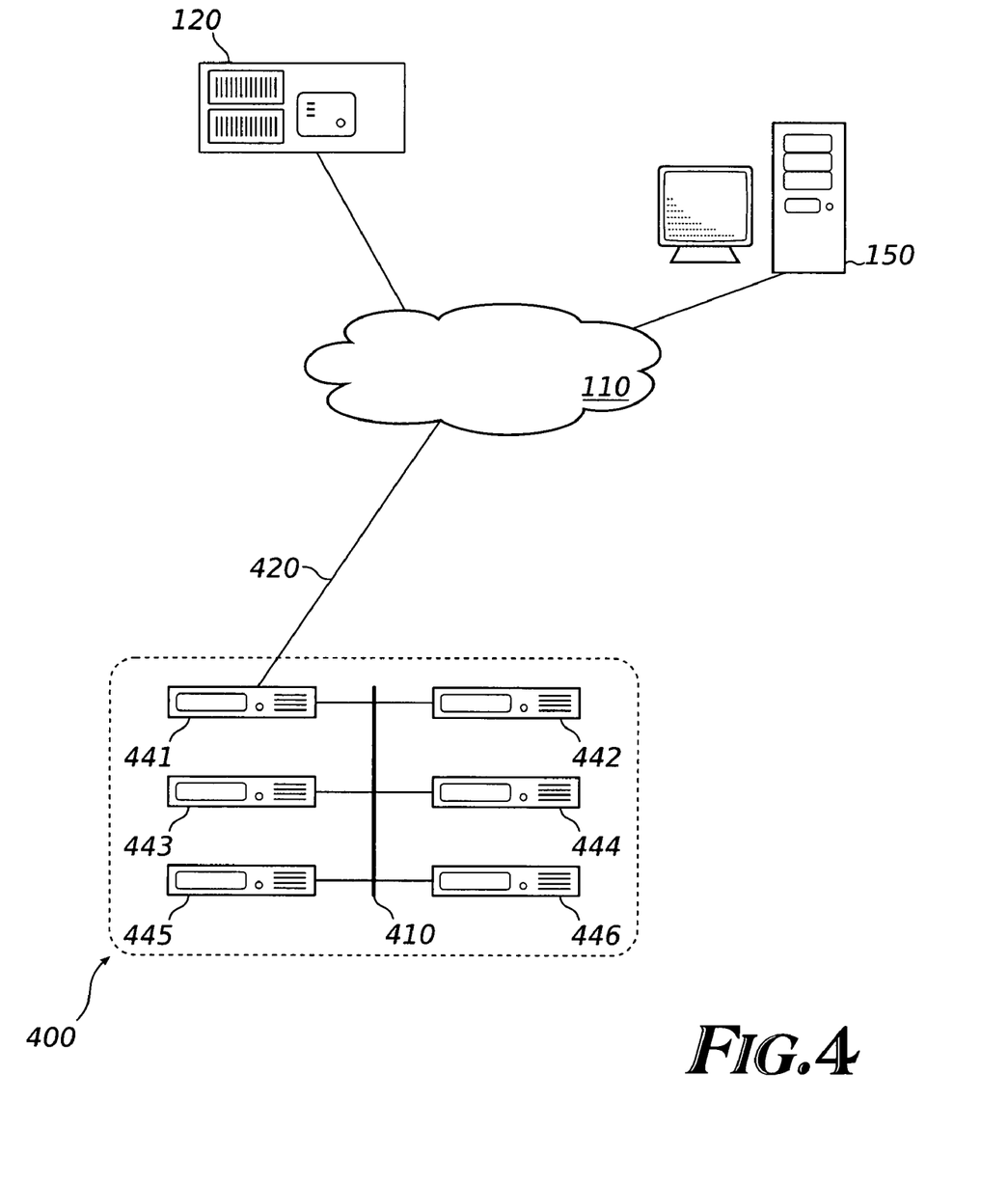
FIG. 4 shows an environment where one variant of the invention may be useful.

Turning now to FIG. 4, a first alternate embodiment will be described. As mentioned earlier in reference to FIG. 1, peer-to-peer software update distribution may provide advantages when software is to be distributed to several machines that are well-connected in a data center. Such a data center is shown at 400: it contains machines 441-446. The machines may all have a common software configuration and consequently require the same set of software updates, or may be differently configured and have different update needs. Each machine in data center 400 may be able to communicate with systems outside the data center (for example, with origin server 120 or peer-to-peer network participant 150) over distributed data network 110. However, inside data center 400, the machines may be able to communicate among themselves over local area network ("LAN") 410 at a much higher rate than is possible over communication link 420.

In this environment, software update distribution can be more efficiently accomplished by designating one machine in the data center (e.g. machine 441) as a caching or repository server. Caching server 441 participates in the peer-to-peer network formed by origin server 120 and other machines connected to network 110 (e.g. client 150), exchanging data segments with other machines to help distribute data objects from origin 120. However, within data center 400, server 441 acts as an origin server for a second, independent peer-to-peer network established among machines 441-446. With this arrangement, only one copy of each data segment required by a machine in the data center will flow from origin server 120 or another "outside" peer-to-peer network participant, across communication link 420, and into caching server 441. Multiple copies of these segments may be transmitted from machine 441 to another peer in the outside network, but this embodiment eliminates much of the software update traffic that would otherwise flow from the outside network to each machine in the data center.

Figure 5:
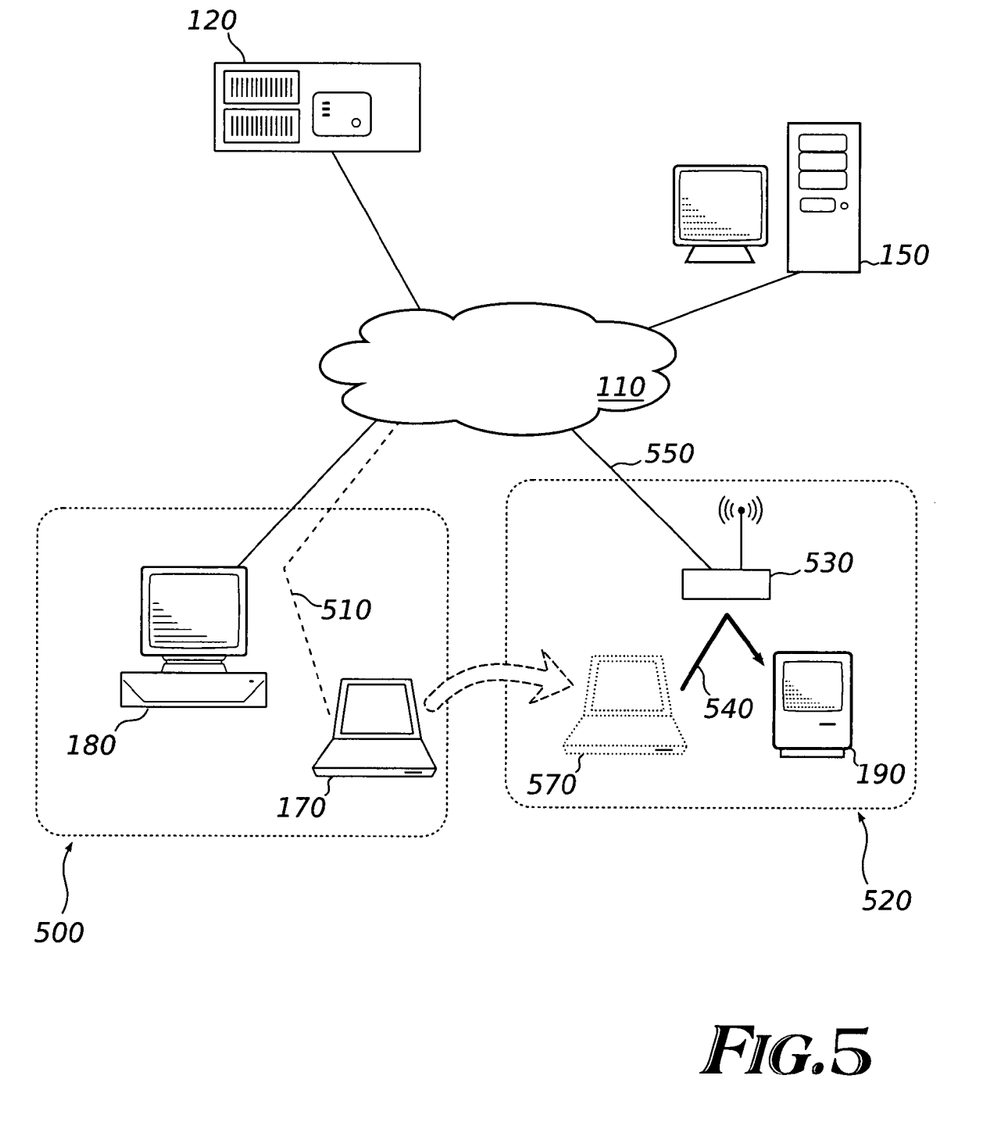
FIG. 5 shows an environment where another variant of the invention may be useful.

A similar reduction in data traffic can be achieved in another environment, depicted in FIG. 5. There, portable system 170 may be operated at a first location 500, where it can take advantage of a high-bandwidth connection 510. While operating there, system 170 may participate in a peer-to-peer data distribution network established between origin server 120 and other systems such as 150 and 180. System 170 may obtain software updates that it can use, but may also download software updates that may be useful to system 190 (and not necessarily useful to system 170). Later, when system 170 is taken to a second location 520 (system movement indicated by dashed figure element 570), it can deliver the software updates downloaded earlier to system 190 over a local connection 540. Local connection 540 may be established, for example, through a small office/home office wireless router 530. When system 190 obtains its software updates from the portable system, it need not download them over communication link 550 (which may be significantly slower than local connection 540). In this scenario, portable system 170 operates similarly to caching server 441 shown in FIG. 4. However, a temporal element is added to the system's operation: portable system 170 makes software updates available to system 190 some time after it collects them. Systems 170 (570) and 190 may, of course, also participate as peers in a peer-to-peer network involving origin server 120 and client 150 by transmitting segments they have to other peers that request them.

In a caching and republishing environment, the caching server may download software packages and updates that are of no use to the caching server itself. For example, the caching server may collect updates for packages that it does not have installed, and even updates or packages that could not be executed on the caching server. (Software designed for a different processor architecture is a simple example of a package that "could not be executed" on the server.)

Figure 6:
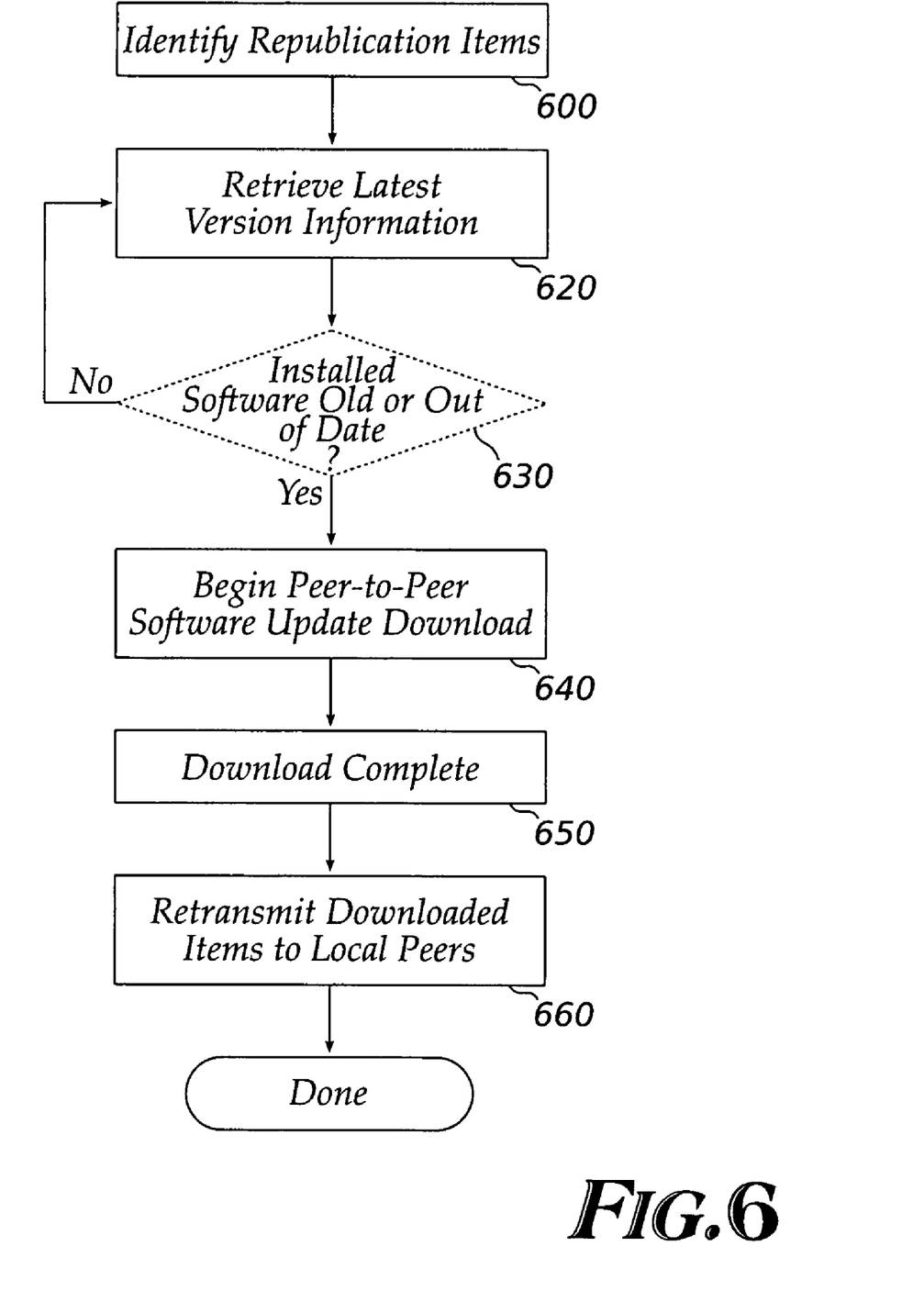
FIG. 6 outlines a method for caching software updates according to an embodiment of the invention.

FIG. 6 is a flow chart outlining some aspects of a republishing method according to an embodiment of the invention. A computer begins by identifying items (software updates, new packages, etc.) to be republished (610). These items can be identified by preparing lists of software configurations of the client machines for which updates are to be cached, or by configuring those client machines to query the caching server for update information. In the latter case, the caching server can extract information from the queries to decide what items should be acquired and made available to the clients.

The caching server may retrieve latest version information about the items to be cached (620) and, in some embodiments, may check to see whether software currently installed at one of the client machines is out of date (630). In other embodiments, it may be more economical for the caching server to download the latest versions of items of interest regardless of the version(s) currently installed at clients, so decision 630 may be skipped.

The caching server downloads the software updates via a peer-to-peer network (640) as described above. When the downloads are complete (650), the updates are retransmitted to cache clients (660). This final operation can be implemented as an ordinary point-to-point communication (i.e. each client receives all of the data in an update package directly from the caching server), or the caching server can serve as an origin server for a separate peer-to-peer network operated among the client machines. The latter arrangement can permit very rapid software distribution to machines in, for example, a data center environment, where high-capacity local area networks ("LANs") provide inter-machine communication facilities. Peer-to-peer distribution within a republishing network reduces bandwidth and processing bottlenecks that may occur when the single caching server sends complete software update packages to every machine that requests them, and promotes higher availability for update data (even if the caching server becomes unavailable for some reason, if all the segments of an update have been distributed to one or another of the machines participating in the republishing peer-to-peer network, all of the participants will be able to reconstruct the complete update).

A system for caching and redistributing software updates through an "internal" or "republishing" peer-to-peer network may include logic to operate the peer-to-peer network differently from a general-purpose peer-to-peer network that may be used for transferring the software update from the origin server to the caching server. For example, participants in a republishing peer-to-peer network may omit the "tit-for-tat" processing that is intended to promote distribution fairness in a general-purpose network. In a republishing network, all participating machines are often commonly-owned, so any "unfairness" may be intentional or at least tolerated. Also, participants in a republishing peer-to-peer network may engage in modified neighbor-discovery protocol to identify peers that are not only willing to exchange data, but are also capable of exchanging the data at least at a minimum speed. Thus, for example, machines in two commonly-owned and -operated data centers can be configured to exchange data only with peers in the same data center; each data center may have its own independent caching server.

Embodiments that operate in the "republishing" mode described above can help in another situation that is logically similar. Many contemporary computer processors (central processing units or "CPUs") can support "virtual machine" operations, where the physical resources of the computer (e.g. memory, mass storage devices, network communication interfaces, etc.) are shared among several concurrent threads of execution, each of which operates as if it had sole and exclusive access to a set of resources. Virtual machines are different from protected mode, multitasking operating systems, which can provide isolated execution environments for a plurality of threads or processes. A virtual machine appears (to software running on it) to be a complete, independent system. Typically, a virtual machine loads and executes a complete set of operating system and application program software. Two virtual machines executing on the same physical hardware may run different versions of an operating system, or even two completely different operating systems.

Figure 7:
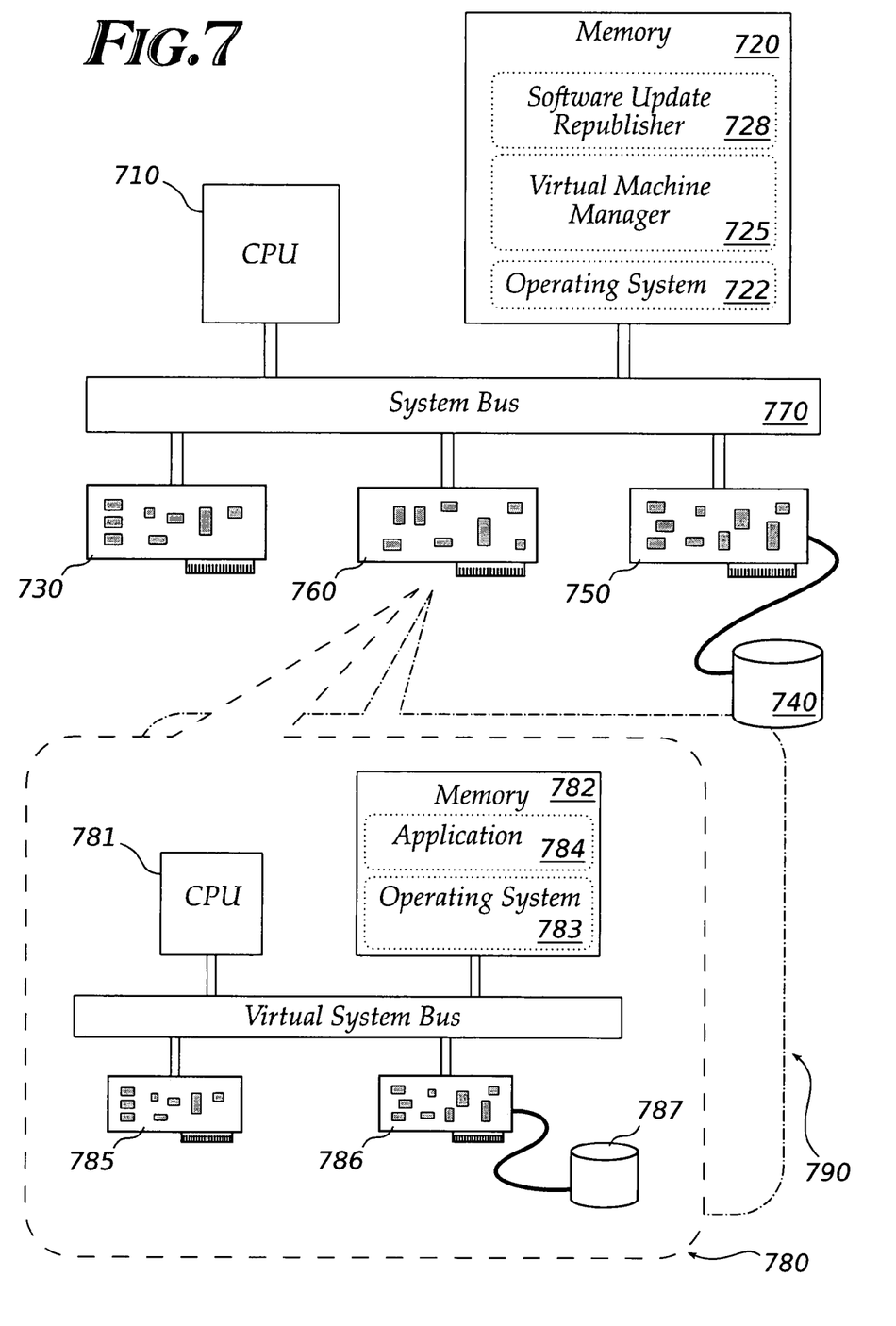
FIG. 7 shows some components and subsystems of a computer that implements an embodiment of the invention.

FIG. 7 represents a virtual machine environment, where a physical CPU 710 executes instructions in memory 720, which cause the CPU to perform operations such as managing physical hardware devices 730, 750 and 760. Devices may be, for example, a network interface 730, a mass storage interface 750 for reading and writing data on a mass storage device 740, or a video interface 760 to present information on a display. The various hardware components exchange control signals and data over a physical system bus 770. Instructions in memory 720 may include, for example, an operating system 722 to manage the machine's physical resources, virtual machine management software 725 to instantiate and operate one or more virtual machines, and, according to an embodiment of the invention, software update republisher 728.

The hardware and software in the physical system may be operative to construct a virtual machine 770, containing simulated and/or emulated elements such as CPU 781, memory 782, communication interface 785, mass storage interface 786 and hard disk 787 Memory 782 may contain an operating system 783 and a software application 784. Operating system 783 is completely independent of operating system 722 and acts to manage and administer the components of virtual machine 780; virtual machine manager 725 may translate some of the actions of operating system 783 or application 784 into actions performed by or on the "real" hardware 710-770.

A single physical system may support two or more virtual machines (a second virtual machine is suggested in this Figure by outline 790). The components and subsystems of virtual machine 790 may be similar to, or different from, the components of virtual machine 780, and either may be similar to, or different from, the components of the real, physical system. Thus, for example, the real machine may have a first type of communication interface 730, while one or more of the virtual machines may have (simulated) communication interfaces 785 of a different type. Software update republishing logic 728 may, consequently, download software updates for a communication interface like element 785 that would be useless on the physical machine (since no such hardware is installed), but that are useful for software running on a virtual machine that includes the simulated interface.

Virtual machines may be controlled by similar or different operating systems. For example, virtual machine 780 may run a version of the Linux® operating system (or another operating system that provides substantially similar functionality and presents a similar or compatible set of system functions for use by application software), while virtual machine 790 runs a version of Microsoft Windows® (or another operating system that provides substantially similar functionality and presents a similar or compatible set of system functions for use by application software). Alternatively, the virtual machines may run the same operating system version, but with different versions of applications installed. Each virtual machine possesses its own independent software configuration, including copies of operating system files, configuration files, applications and the like. (The physical machine and/or the virtual machine manager may implement data sharing between virtual machines to save space, but shared data will usually become unshared if one or another of the virtual machines changes it.) Virtual machines are useful for testing interactions between various pieces of software.

In a virtual machine environment like that shown in FIG. 7, software update republishing logic 728 can participate in an external peer-to-peer network to obtain software updates and packages to be applied to virtual machines 780 and 790. These updates can be provided to the virtual machines in much the same way that updates are provided to machines in a data center environment, as described above. However, all the "republication" peer-to-peer (or server-to-client) data communications may occur within the physical machine. For example, the virtual machine manager can stimulate the virtual machines' operating systems to behave as if they had received network packets over a virtual network interface, the packets containing portions of the software updates to be republished. This can improve the speed and efficiency of delivering updates to the virtual machines, since each of the virtual machines might otherwise download separate copies of updates. (The downloads would take place over the same physical equipment and be stored on the same physical mass storage device, so it is preferable for the physical machine to download and store the data only once, and offer it to the virtual machines through internal, simulated network operations.)

It is appreciated that there are at least two distinct classes of data involved in distributing software updates. First, there is version information to identify currently-installed software and available updates thereto; and second, there is the update data itself. Version information may be smaller and more variable than update data, so it may be preferable to distribute version information through ordinary (non peer-to-peer) channels. For example, a manifest listing currently-available versions of a group of software packages may be retrieved from a web server. On the other hand, in some environments, version lists may contain information about a large number of packages, and may themselves be large in size. A peer-to-peer network can be used to distribute this "metadata" (data about other data—in this case, data describing the versions and dependencies of software available in software update packages).

An embodiment of the invention may be a machine-readable medium having stored thereon data and instructions to cause a programmable processor to perform operations as described above. In other embodiments, the operations might be performed by specific hardware components that contain hardwired logic. Those operations might alternatively be performed by any combination of programmed computer components and custom hardware components.

Instructions for a programmable processor may be stored in a form that is directly executable by the processor ("object" or "executable" form), or the instructions may be stored in a human-readable text form called "source code" that can be automatically processed by a development tool commonly known as a "compiler" to produce executable code. Instructions may also be specified as a difference or "delta" from a predetermined version of a basic source code. The delta (also called a "patch") can be used to prepare instructions to implement an embodiment of the invention, starting with a commonly-available source code package that does not contain an embodiment.

In the preceding description, numerous details were set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions were presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, compact disc read-only memory ("CD-ROM"), and magnetic-optical disks, read-only memories ("ROMs"), random access memories ("RAMs"), eraseable, programmable read-only memories ("EPROMs"), electrically-eraseable read-only memories ("EEPROMs"), magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), a machine readable transmission medium (electrical, optical, acoustical or other form of propagated signals (e.g., carrier waves, infrared signals, digital signals, etc.)), etc.

The applications of the present invention have been described largely by reference to specific examples and in terms of particular allocations of functionality to certain hardware and/or software components. However, those of skill in the art will recognize that distribution of software updates and packages over a peer-to-peer network can also be implemented by software and hardware that distribute the functions of embodiments of this invention differently than herein described. Such variations and implementations are understood to be captured according to the following claims.

I claim:

1. A computer-implemented method for distributing software packages in a peer-to-peer network, the method comprising:
   identifying, by a first peer in a peer-to-peer network, a software package of interest, the first peer having a first version of the software package installed thereon;
   retrieving, by the first peer, information about a second version of the software package;
   determining, based on the information about the second version of the software package, whether the first version of the software package installed at the first peer corresponds to the second version of the software package; and
   if the first version of the software package installed at the first peer does not correspond to the second version of the software package,
   retrieving, by the first peer, the second version of the software package from a plurality of other peers in the peer-to-peer network, the plurality of other peers comprising at least two different peers storing different segments of the second version of the software package, wherein the first peer receives a first segment of the second version of the software package from one of the plurality of other peers upon providing a second segment of the latest version to the one of the plurality of other peers; and
   providing the second version of the software package to a virtual machine hosted by the first peer for installation.

2. The method of claim 1, further comprising:
   discarding the second version of the software package after the installation.

3. The method of claim 1, further comprising:
   distributing the second version of the software package to peers in the peer-to-peer network after the installation.

4. The method of claim 1, further comprising:
   reviewing a software configuration of a client machine to determine what software packages are installed, wherein
   the identifying operation is to identify one of the installed software packages.

5. The method of claim 1 wherein identifying comprises:
   receiving a software update query from a client machine; and
   extracting an identity of the software package of interest from the software update query.

6. The method of claim 1 wherein the peer-to-peer network is a first peer-to-peer network, the method further comprising:
   distributing the second version of the software package to peers in a second peer-to-peer network, and wherein the installation is performed by a peer in the second peer-to-peer network.

7. The method of claim 1, wherein the installation alters a software configuration of the virtual machine.

8. A non-transitory computer-readable medium containing data and instructions to cause a programmable processor to perform operations for distributing software packages in a peer-to-peer network, the operations comprising:
   retrieving information about a latest version of a software package;
   determining, based on the information about the latest version of the software package, whether an installed version of the software package corresponds to the latest version of the software package;

if the installed version of the software package does not correspond to the latest version of the software package, retrieving a first portion of the latest version of the software package from a first peer in the peer-to-peer network; and retrieving a second portion of the latest version of the software package from a second, different peer in the peer-to-peer network, wherein the first portion and the second portion of the latest version of the software package are received from the first peer and the second peer upon providing one or more other portions of the latest version of the software package to the first peer and the second peer; and transmitting the first and second portions of the latest version of the software package to a virtual machine of an update target system for installation.

9. The non-transitory computer-readable medium of claim 8 wherein the virtual machine is instantiated by instructions and data controlling the programmable processor.

10. The non-transitory computer-readable medium of claim 8 wherein the peer-to-peer network is a first peer-to-peer network, and wherein the update target system is a peer in a second, different peer-to-peer network.

11. The non-transitory computer-readable medium of claim 8 wherein retrieving information about the latest version of the software package comprises obtaining the information from a web server.

12. A non-transitory computer-readable medium containing data and instructions to cause a programmable processor to perform operations for distributing software packages in a peer-to-peer network, the operations comprising:

retrieving information about a latest version of a software package;

determining, based on the information about the latest version, whether an installed version of the software package corresponds to the latest version of the software package;

if the installed version of the software package does not correspond to the latest version of the software package, retrieving a first portion of the latest version of the software package from a first peer in a peer-to-peer network; and retrieving a second portion of the latest version of the software package from a second, different peer in the peer-to-peer network; and transmitting the first and second portions of the data object latest version of the software package to a virtual machine of an update target system for installation;

wherein retrieving the information about the latest version of a software package comprises:

obtaining a first portion of the information from a third peer in the peer-to-peer network; and obtaining a second portion of the information from a fourth peer in the peer-to-peer network, wherein the first peer, second peer, third peer and fourth peer comprise at least two different peers.

13. The non-transitory computer-readable medium of claim 8 wherein the retrieving operations are to occur over a first network connection, and the transmitting operation is to occur over a second network connection.

14. A computer system for a first peer to distribute software packages in a peer-to-peer network, the system comprising:

a memory; and a processor, coupled to the memory, to:

identify a software package of interest, the computer system for the first peer having a first version of the software package installed thereon;

retrieve information about a second version of the software package;

determine, based on the information about the second version of the software package, whether the first version of the software package corresponds to the second version of the software package; and if the first version of the software package installed at the first peer does not correspond to the second version of the software package, retrieve the second version of the software package from a plurality of other peers in the peer-to-peer network, the plurality of other peers comprising at least two different peers storing different segments of the second version of the software package, wherein the first peer receives a first segment of the second version of the software package from one of the plurality of other peers upon providing a second segment of the latest version to the one of the plurality of other peers; and providing the second version of the software package to a virtual machine of the first peer for installation.

15. The system of claim 14, wherein the processor is further to:

discard the second version of the software package after the installing operation.

16. The system of claim 14, wherein the processor is further to:

distribute the second version of the software package to peers in the peer-to-peer network after the installing operation.

17. The system of claim 14, wherein the processor is further to:

review a software configuration of a client machine to determine what software packages are installed.

18. The system of claim 14, wherein the processor is to identify the software package of interest by:

receiving a software update query from a client machine; and extracting an identity of the software package of interest from the software update query.

19. The system of claim 14, wherein the installation alters a software configuration of the virtual machine.

* * * * *